UNITED STATES PATENT OFFICE.

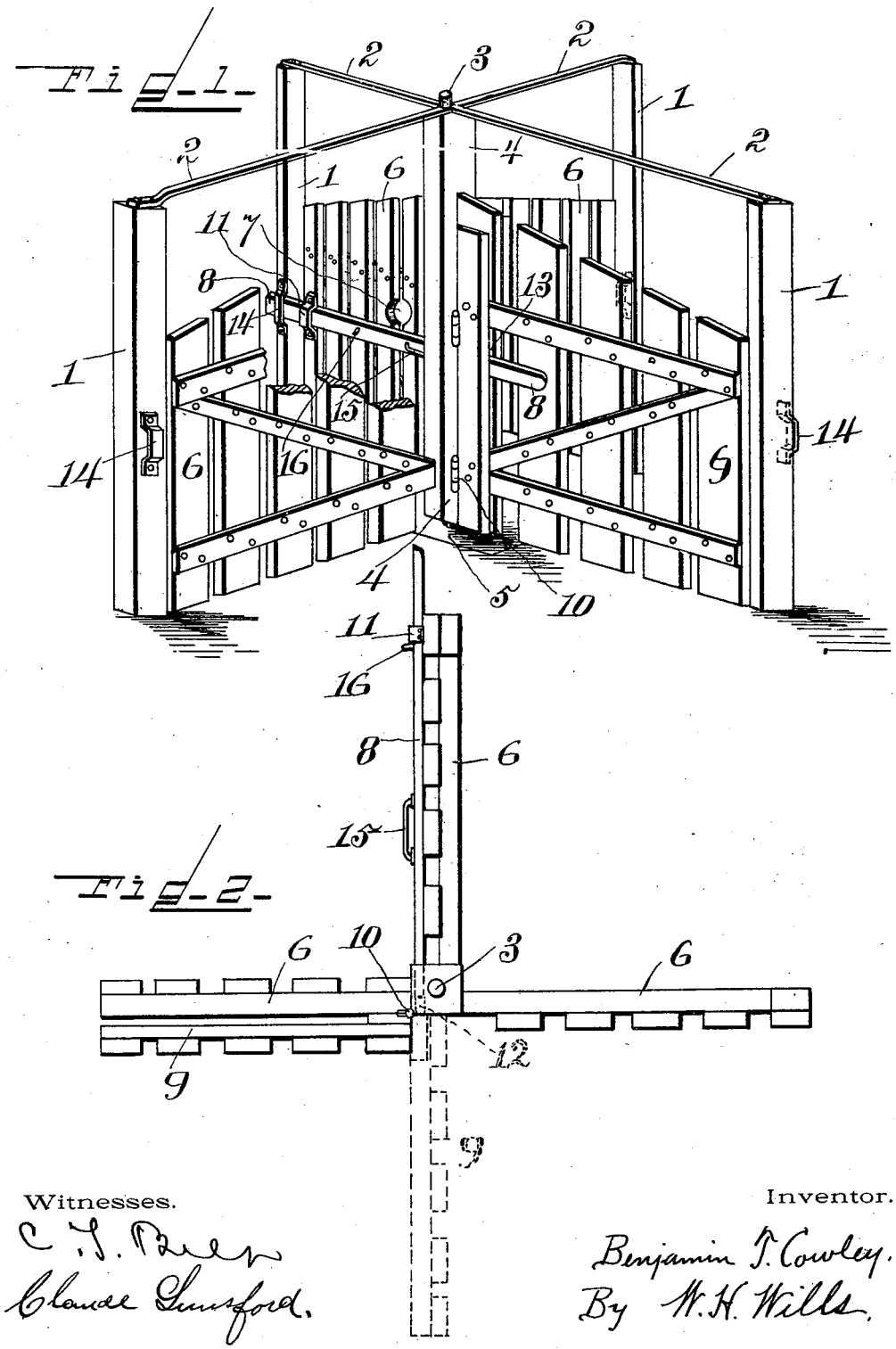

BENJAMIN T. COWLEY, OF NEW BOSTON, TEXAS.

TURNSTILE-GATE.

SPECIFICATION forming part of Letters Patent No. 545,457, dated September 3, 1895.

Application filed May 24, 1895. Serial No. 550,476. (No model.)

*To all whom it may concern:*

Be it known that I, BENJAMIN T. COWLEY, a citizen of the United States, residing at New Boston, in the county of Bowie and State of Texas, have invented certain new and useful Improvements in Turnstile-Gates; and I do hereby declare the following to be a full, clear, and exact description of the invention, such as will enable others skilled in the art to which it appertains to make and use the same.

This invention relates to gates, and particularly to a turnstile-gate; and the object of the invention is to provide a gate of novel construction to be used at the intersection of a number of fences that access may be had through the gate from one to the other of the inclosures formed by said fences. The gate is especially designed for use in stock yards or farms where cattle-pens are formed as usual by several fences diverging from one point in different directions, the gate being placed at such pivot between the fences and revolved upon the point and one or more wings swung on said pivot in order to give access to any desired inclosure or pen.

The invention consists in the novel construction and arrangement of parts, as will be hereinafter more fully described, and pointed out in the claims.

In the accompanying drawings, forming part of this specification, Figure 1 is a perspective view, partly broken away, showing my gate pivotally secured at the intersection of the end posts of four fences with the gate locked against all inclosures. Fig. 2 is a top view with brace-rods removed, the gate locked against two inclosures, and the hinged wing swung to open communication between the other two inclosures.

The same numeral-references denote the same parts in the figures of the drawings.

The fences are not shown, but the fence end posts 1 are braced together by rods 2, at the intersection of which the pivot 3 of the gate-post 4 engages, while the opposite end of said post 4 is similarly pivoted in a block or plate 5, embedded in the earth, leaving the post 4 firmly pivoted centrally between the four fence-posts 1.

Rigid with the post 4 and projecting horizontally from it nearly to the posts 1, or close enough to leave only a slight clearance, are the gate-wings 6, one or more of which have a hand-hole 7, so that the slide-latch bar 8 may be operated from any of the inclosures, while the gate-wing 9 is hinged to the post 4 at 10, and is held locked with the post 4 by means of the latch-bar 8, slidably secured to the fixed wing opposite by means of the keeper 11, its inner end extending through a slot 12 in the post 4 and through the opening 13 of the hinged wing 9, this wing 9, as well as the other wings and post 4, being locked by sliding the bar 8 into the keeper 14 on any one of the fence-posts 1, as shown in Fig. 1. The bar 8 is provided with a handle 15, placed at such a distance from the inner end of the said bar as to keep the latter from being moved too far inward, while the stop 16 prevents the bar from being moved entirely out of the post, as shown in Fig. 2.

To prepare the gate to be turned as a turnstile, the latch-bar is moved inward until its outer end clears the posts 1. This keeps the hinged wing locked to the post 4 and leaves the gate with all its wings free to be revolved. When the hinged wing is brought into position to open communication between two inclosures, the latch is moved out of the opening 13 into one of the keepers 14, which leaves the hinged wing free and locks the wing opposite to its fence-post and fixes the other wings in line with their respective fence-posts.

Having thus described my invention, what I claim as new, and desire to secure by Letters Patent, is—

1. A gate comprising a vertically pivoted post, horizontal wings fixed to the post, a wing hinged to the post, and the slidable latch bar adapted to lock the said post to an adjacent fence, and to lock the said hinged wing to the aforesaid post, substantially as set forth.

2. In a turn-stile gate, the combination of the vertically pivoted post, the gate wings fixed to the post, with the gate wing hinged to the post, and the latch bar slidably secured to the fixed wing opposite the hinged wing and adapted to slide through the said post, to lock the hinged wing to the post, as set forth.

3. The slotted post, the brace rods connecting the ends of intersecting fences, and in which the said post is pivoted, combined with the wings fixed to the post, the wing hinged to the post, and the latch bar slidably secured upon the fixed wing opposite the hinged wing to lock the latter with said post and the post with the fences, as set forth.

In testimony whereof I affix my signature in presence of two witnesses.

BENJAMIN T. COWLEY.

Witnesses:
 GEO. T. LEMONS,
 E. W. CARVIN.